United States Patent
Shellhause

[11] 3,766,802
[45] Oct. 23, 1973

[54] BRAKE PEDAL ASSEMBLY
[75] Inventor: Ronald L. Shellhause, Vandalia, Ohio
[73] Assignee: General Motors Corporation, Detroit, Mich.
[22] Filed: Dec. 6, 1972
[21] Appl. No.: 312,701

[52] U.S. Cl. .................................. 74/512, 74/560
[51] Int. Cl. ............................................. G05g 1/14
[58] Field of Search ................. 74/512, 104, 560; 287/12, 21, 87

[56] References Cited
UNITED STATES PATENTS
2,167,868  8/1939  Best .................................. 74/560 X
3,014,381  12/1961  Frank ................................. 74/512

Primary Examiner—Milton Kaufman
Assistant Examiner—Frank H. McKenzie, Jr.
Attorney—W. E. Finken et al.

[57] ABSTRACT

This invention involves providing a brake pedal assembly which comprises a brake pedal lever wth a socket portion, a push rod with a headed end portion positioned within the socket portion, and a spring which is supported upon the brake pedal lever and which biasingly retains the headed end portion of the push rod in firm engagement with the socket portion to provide for the headed end portion of the push rod to pivot in engagement with the brake pedal lever and within the socket portion when the push rod is moved axially in response to operative movement of the brake pedal lever.

4 Claims, 3 Drawing Figures

PATENTED OCT 23 1973　　　　　　　　　　　　　　3,766,802

BRAKE PEDAL ASSEMBLY

The present invention relates to a brake pedal assembly for vehicles and, more particularly, to a brake pedal assembly having a swingably supported brake pedal lever and a push rod engaged therewith to transfer movement of the brake pedal to control actuation of the brake system.

Brake pedal assemblies for vehicle brake systems conventionally comprise a swingably supported brake pedal lever which is operatively movable to control actuation of the vehicle brake system and a push rod which moves axially in response to movement of the brake pedal lever and which transfers that movement to the vehicle brake system. It is also conventional for the push rod be pivotally connected with the brake pedal lever in order to provide for axial displacement or movement of the push rod upon operative movement of the brake pedal lever. It is desirable in such brake pedal assemblies to prevent rattling between the push rod and the brake pedal lever which results from a loose or loosened pivotal connection therebetween.

Accordingly, one feature of the present invention is to provide a new and improved brake pedal assembly for a vehicle brake system which maintains a firmly engaged pivotal connection between the brake pedal lever and the push rod to prevent rattling therebetween.

Another feature of the present invention is to provide a new and improved brake pedal assembly, in accordance with the above stated feature, and wherein a spring supported on the brake pedal lever biasingly retains the push rod in a firm pivotal engagement with the brake pedal lever to prevent rattling therebetween.

Yet another feature of the present invention is to provide a new and improved brake pedal assembly, in accordance with the above stated features, and wherein the spring biasingly retains the firm pivotal engagement between the push rod and brake pedal lever with an arm member which resiliently engages a headed end of the push rod.

Yet a further feature of the present invention is to provide a new and improved brake pedal assembly in accordance with the above stated features, and wherein the spring which biasingly retains the firm pivotal engagement between the brake pedal lever and push rod is snap-fittingly retained upon a support member of the brake pedal lever.

These and other features of the present invention are provided in a preferred embodiment by providing a brake pedal assembly for a vehicle having a brake system and which comprises a brake pedal lever which has a socket portion and which is swingably supported by means on the vehicle for operative movement to control actuation of the vehicle brake system, the assembly also comprises a push rod which has a headed end portion which is positioned within the socket portion of the brake pedal lever and which is supported by means on the vehicle for axial movement in response to operative movement of the brake pedal lever to transfer that movement to control actuation of the brake system. The assembly further comprises spring means which is supported upon the brake pedal lever and which biasingly retains the headed end portion of the push rod in firm engagement with the socket portion to provide for the headed end portion of the push rod to pivot in engagement with the brake pedal lever and within the socket portion when the push rod is moved axially in response to operative movement of the brake pedal lever.

These and other features of the present invention will become more fully apparent with reference to the following detailed description and drawing wherein.

Figure 1:
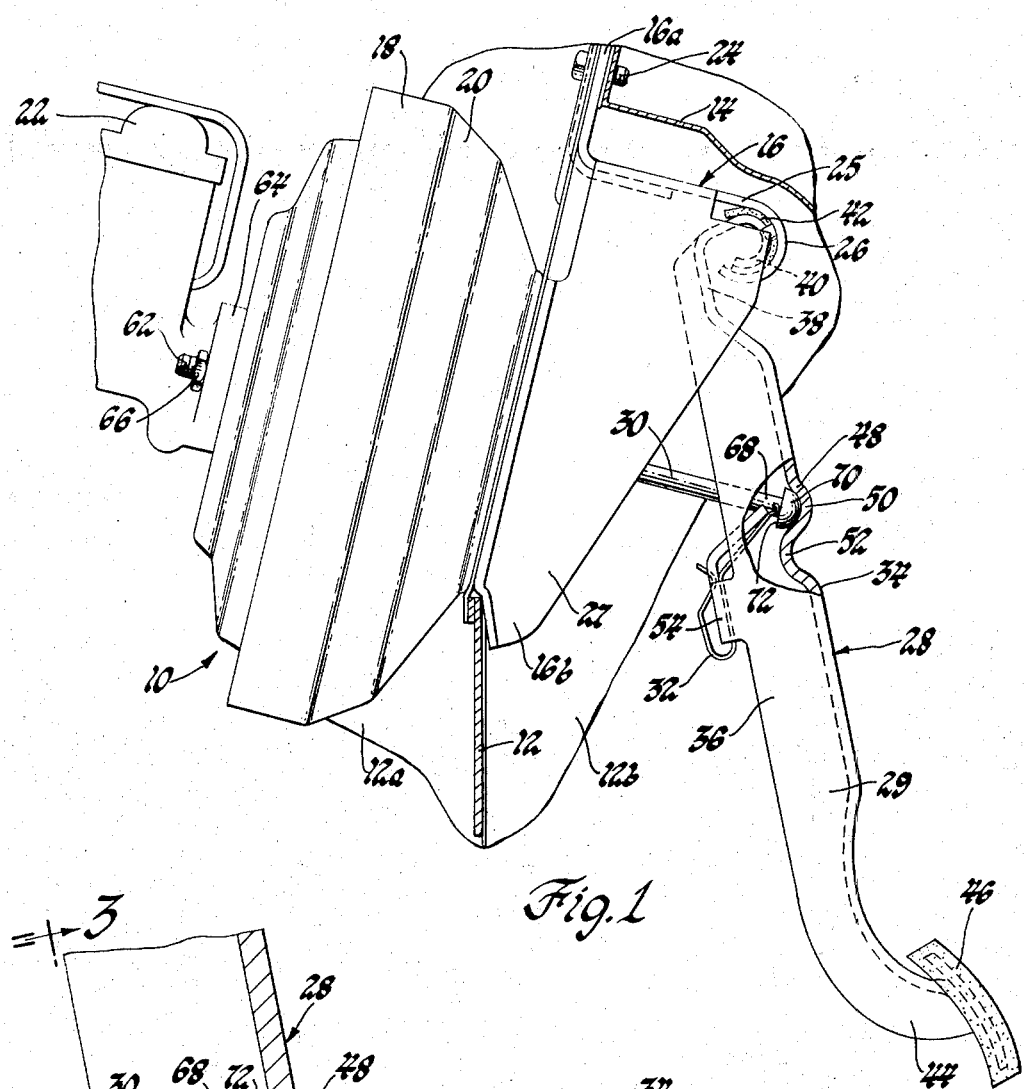
FIG. 1 is an elevational view with parts broken away and in section of part of a brake control mechanism assembled within a vehicle and embodying the present invention.

As representing a preferred embodiment of the present invention, the drawing shows a brake control module 10 of a vehicle brake system. The module 10 is mounted within an opening in the firewall 12 of a vehicle and underneath a portion of the vehicle's instrument panel 14. The brake control module 10, which is the subject of U. S. Pat. application Ser. No. 158,426, includes a mounting bracket 16 and a brake system operator 18 which consists of a brake booster 20 and a master cylinder 22. Significantly, the brake system operator 18 could be of any of several other well known types. The brake system operator 18 is shown as mounted on one side of the mounting bracket 16 so that it projects normally into the vehicle compartment 12a forward of the vehicle firewall 12. As previously stated, the brake control module 10 is received within an opening in the firewall 12 and with the mounting bracket 16, which is oversized with respect to the opening in the firewall 12, being positioned upon the passenger compartment side 12b. The mounting bracket 16 has an upper flange portion 16a which is attached by any suitable means, herein shown as a bolt 24, between the firewall 12 and instrument panel 14. Further, the mounting bracket 16 has a bifurcated lower portion 16b which is received over the edge of the firewall 12, where it defines the opening therein, for the brake control module 10 to rest and be supported thereon. The mounting bracket 16 has an upper portion 25 which extends normally from the upper flange 16a into the passenger compartment side 12b and which terminates in a reversely curled or scrolled end 26. The mounting bracket 16 also has a pair of side plates 27 which provide additional strength to the mounting bracket 16 and which extend normally from the firewall 12 into the passenger compartment side of the vehicle and adjacent the upper portion 25.

The brake control module 10 further comprises the brake pedal assembly 28 of the present invention. The brake pedal assembly 28 comprises a brake pedal lever 29 for controlling actuation of the brake system operator 18 upon operative movement thereof, a push rod 30 for transferring the movement of the brake pedal lever 29 and a spring means 32 which biasingly retains the push rod 30 in engagement with the brake pedal lever 29.

Figure 2:
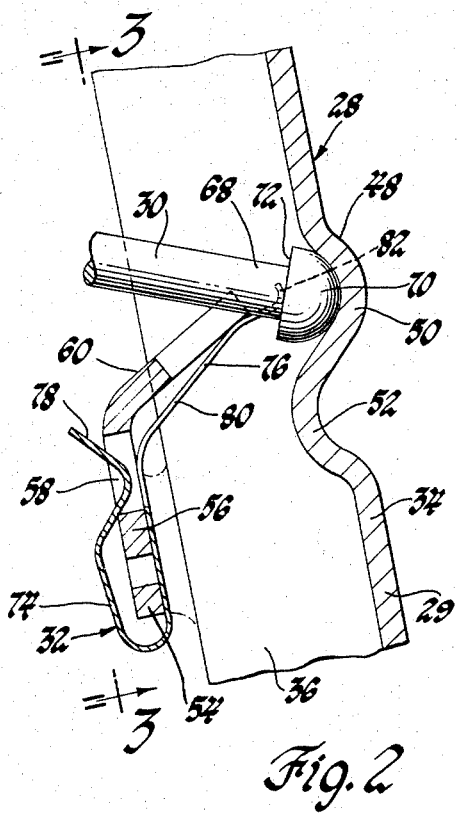
FIG. 2 is an enlarged fragmentary view in cross-section of the brake pedal assembly of the present invention.

Referring to FIGS. 1 and 2, the brake pedal lever 29 is shown as an elongated member of generally U-shaped cross-section and having a face side 34 and a pair of side flanges 36 which extend normally from the face side 34. The brake pedal lever 29 has its upper end portion 38 swingably supported upon the mounting bracket 16. In this respect, the upper end portion 38 of the brake pedal lever 29 terminates in a reversely curled or scrolled end 40 which is received and retained in a complementary fashion within the scrolled end 26 of the upper portion 25 of the mounting bracket 16. Further, a flexible sheet bushing 42 is positioned between the scrolled ends 26 and 40 of the upper portion 25 and upper end portion 38, respectively. The lower end portion 44 of the brake pedal lever 29 is adapted to be operatively moved by the vehicle driver. In this respect, the lower end portion 44 of the brake pedal lever 29 has a foot pad or pedal 46 supported thereon. For a more detailed description of the brake control module 10 described thus far, reference U. S. Pat. application Ser. No. 158,426.

Figure 3:
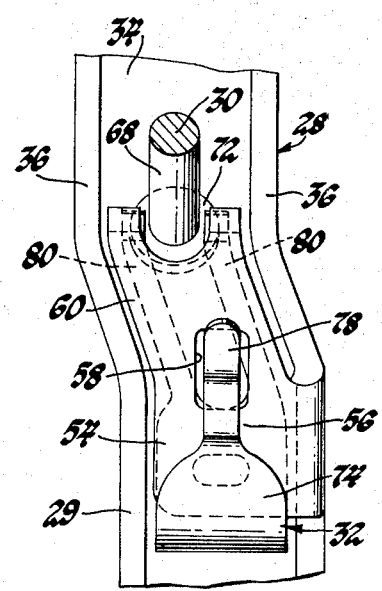
FIG. 3 is a cross-sectional view taken along line 3—3 of FIG. 2.

Referring to FIGS. 2 and 3, the brake pedal lever 29 has a socket portion 48 intermediate its upper and lower end portions 38 and 44, respectively. The socket portion 34 is formed integrally within the face side 34 of the brake pedal lever 29 and takes the form of an S-shaped bend therein. In this respect, the face side 34 of the brake pedal lever 29 has a rounded, outwardly extending bend 50 defining the upper portion of the socket 48 and an inwardly, rounded bend 52 defining the lower portion of the socket 48.

The brake pedal lever 29 also has a support member 54 which extends between the side flanges 36 oppositely of the face side 34. The support member 54 has a lower portion 56 integral with the side flanges 36 and in a generally lateral relationship with the face side 34. Further, the lower portion 56 has an opening 58 extending therethrough. Adjacent the opening 58 of the lower portion 56, the support member 54 has an upper portion 60 which is bifurcated and which extends between the side flanges 36 toward the socket 38.

The push rod 30 is a generally elongated, cylindrical member which extends into the brake booster and wherein it is operatively connected to control the booster to actuate the master cylinder 22 in a manner well-known to those skilled in the art. As shown in FIG. 1, threaded end bolts 62 extends outwardly of the brake booster 20 and into the engine compartment side 12a of the vehicle where they are fastended to a flange 64 of the master cylinder 22 by any suitable means, herein shown as a complementary threaded nut 66 there by mounting the master cylinder on the booster housing. It should be understood that the push rod 30 is supported within the brake booster 20 for axial movement. The other end portion 68 of the push rod 30 has a rounded, hemispherical head portion 70 with a flat inner side 72. The push rod 30 adjacent its hemisperical head portion 70 extends through the bifurcated upper portion 60 of the support member 54, and the hemispherical head portion 70 is positioned in engagement with the face side 34 of the brake pedal lever and in a complementary fashion within the socket 48. The outwardly extending, rounded out bend 50 of the face side 34 prevents upward and lateral displacement of the push rod 30 and, similarly, the inward extending, rounded bend 52 of the face side 34 prevents downward displacement of the push rod 30. Thus, it should be understood that the push rod 30 will be moved axially in response to operative swinging movement of the brake pedal lever 29 and thereby transfers the movement of the brake pedal lever 29 to control actuation of the brake system operator 18.

The spring means 32 has a lower portion 74 positioned upon the support means 54 of the brake pedal lever 29 and an upper portion 76 which biasingly retains the hemispherical head portion 70 of the push rod 30 in engagement with the socket 48 of the brake pedal lever 29. The lower portion 74 is reversely bent or generally U-shaped and is slidably engageable with the lower portion 56 of the support member 54 of the brake pedal lever 29. The lower portion 74 of the spring means 32 has an inwardly bent end portion 78 which is snap-fittingly received within the opening 58 of the support member 54 and which serves as a detent to retain the spring means 32 thereon. The upper portion 76 of the spring means 32 is bifurcated and comprises a pair of spring arms 80 which extend adjacent the upper portion 60 of the support member 54 and between the side flanges 36 of the brake pedal lever 29. Each of the spring arms 80 engages the upper portion 60 of the support member 54 and terminates beyond the upper portion 60 of the support member 54 in a rounded end which engages the hemispherical head portion 70 of the push rod 30. In this respect, the spring arms 80 of the spring means 32 extend about the push rod 30 and the rounded ends 82 of the spring arms 80 biasingly engage the flat inner end 72 of the hemispherical head portion 70 to retain the hemispherical head portion 70 in firm engagement with the socket 48 of the brake pedal lever 29.

When the vehicle driver desires to actuate the vehicle brake system, the lower end portion 44 and foot pedal 46 of the brake pedal lever 29 are depressed toward the firewall 12 and the brake pedal lever 29 is swung clockwise, with reference to FIG. 1, by virtue of its swingable connection. As the brake pedal lever 29 is pivoted, the hemispherical head portion 70 of the push rod 30, which is retained in firm engagement with the socket 48 of the brake pedal lever 29 by the spring means 32, is caused to pivot in firm engagement with the socket 48 and the push rod 30 is shifted axially to effect actuation of the brake system operator 18. Similarly, the hemispherical head portion 70 of the push rod 30 is caused to pivot in firm engagement with the socket 48 when the brake pedal lever 29 is released to de-actuate the vehicle brake system, and the brake system operator 18 shifts the push rod axially and pivots the brake pedal lever 29 back to the position shown in FIG. 1. Thus, the spring means 32 retains the hemispherical head portion 70 of the push rod 30 constantly in firm engagement with the socket 48 of the brake pedal lever 29 and prevents rattling between the push rod 30 and the brake pedal lever 29. It should also be understood that the connection between the push rod 30 and the brake pedal lever 29 will not loosen with extended use, as some other mechanical connections would, because of the inherent resilient characteristics of the spring means 32. In view of the above detailed description, another feature of the present invention which should be apparent is the ease and speed of assembly of the brake pedal assembly 28. Thus, the present invention lends itself to efficiency in production and reliability in use.

The foregoing disclosure relates to only one embodiment of the present invention which may be modified within the scope of the appended claims.

What is claimed is:

1. In a vehicle having a brake system, a brake pedal assembly, comprising: a brake pedal lever having a socket portion; means on the vehicle for swingably supporting said brake pedal lever for operative movement of said brake pedal lever to control actuation of the brake system; a push rod having a headed end portion positioned within said socket portion of said brake pedal lever; means on the vehicle for supporting said push rod for axial movement in response to operative movement of said brake pedal lever to transfer the movement of said brake pedal lever to control actuation of the brake system; and spring means supported upon said brake pedal lever for biasingly retaining said headed end portion of said push rod in firm engagement with said socket portion to provide for said headed end portion of said push rod to pivot in engagement with said brake pedal lever and within said socket portion when said push rod is moved axially in response to operative movement of said brake pedal lever.

2. In a vehicle having a brake system, a brake pedal assembly, comprising: a brake pedal lever having a rounded out socket portion; means on the vehicle for swingably supporting said brake pedal lever for operative movement to control actuation of the vehicle brake system; a push rod having a rounded head portion positioned within said socket portion of said brake pedal lever; means on the vehicle for supporting said push rod for axial movement in response to operative movement of said brake pedal lever to transfer the movement of said brake pedal lever to control actuation of the brake system; and spring means supported upon said brake pedal lever and having an arm member resiliently engaging said rounded head portion of said push rod oppositely of said socket portion of said brake pedal lever for retaining said rounded head portion firmly in engagement with said socket portion and providing for said rounded head portion to pivot in engagement with said socket portion when said push rod is moved axially in response to operative movement of said brake pedal lever.

3. In a vehicle having a brake system, a brake pedal assembly, comprising: a brake pedal lever having an integral rounded out socket portion and also having a support member adjacent said socket portion; means on the vehicle for swingably supporting said brake pedal lever for operative movement to control actuation of the brake system; a push rod having a hemispherical end portion received within said socket portion of said brake pedal lever; means on the vehicle for supporting said push rod for axial movement in response to operative movement of said brake pedal lever to transfer the movement of said brake pedal lever to control actuation of the brake system; and a spring having a first portion snap-fittingly engageable with said support member of said brake pedal lever and having a second arm portion biasingly engaging said hemispherical end portion of said push rod oppositely said socket portion for retaining said hemispherical head portion of said push rod in firm engagement with said socket portion and to provide for said hemispherical head portion to pivot in engagement with said socket portion when said push rod is moved axially in response to operative movement of said brake pedal lever.

4. In a vehicle having a brake system, a brake pedal assembly, comprising: a brake pedal lever having a generally centrally located rounded out socket portion and also having an orificed support member adjacent said socket portion; means on the vehicle and adjacent the upper end of said brake pedal lever for swingably supporting said brake pedal lever for operative movement to control the actuation of the brake system; a push rod having a hemispherical head portion with a flat inner end and with said hemispherical head portion complementarily positioned within said socket portion of said brake pedal lever; means on the vehicle for supporting said push rod for axial movement in response to operative movement of said brake pedal lever to transfer the movement of said brake pedal lever to control actuation of the brake system; and a spring having a first reversely bent portion slidably received upon said support member and having a detent snap-fittingly received within the orifice of said support member to retain said spring thereon, said spring having a pair of spaced apart arm portions extending about said push rod and resiliently engaging said flat inner end of said hemispherical head portion for retaining said hemispherical head portion in firm engagement with said socket portion and providing for said hemispherical head portion to pivot in engagement with said socket portion when said push rod is moved axially in response to operative movement of said brake pedal lever.

* * * * *